United States Patent Office 3,390,117
Patented June 25, 1968

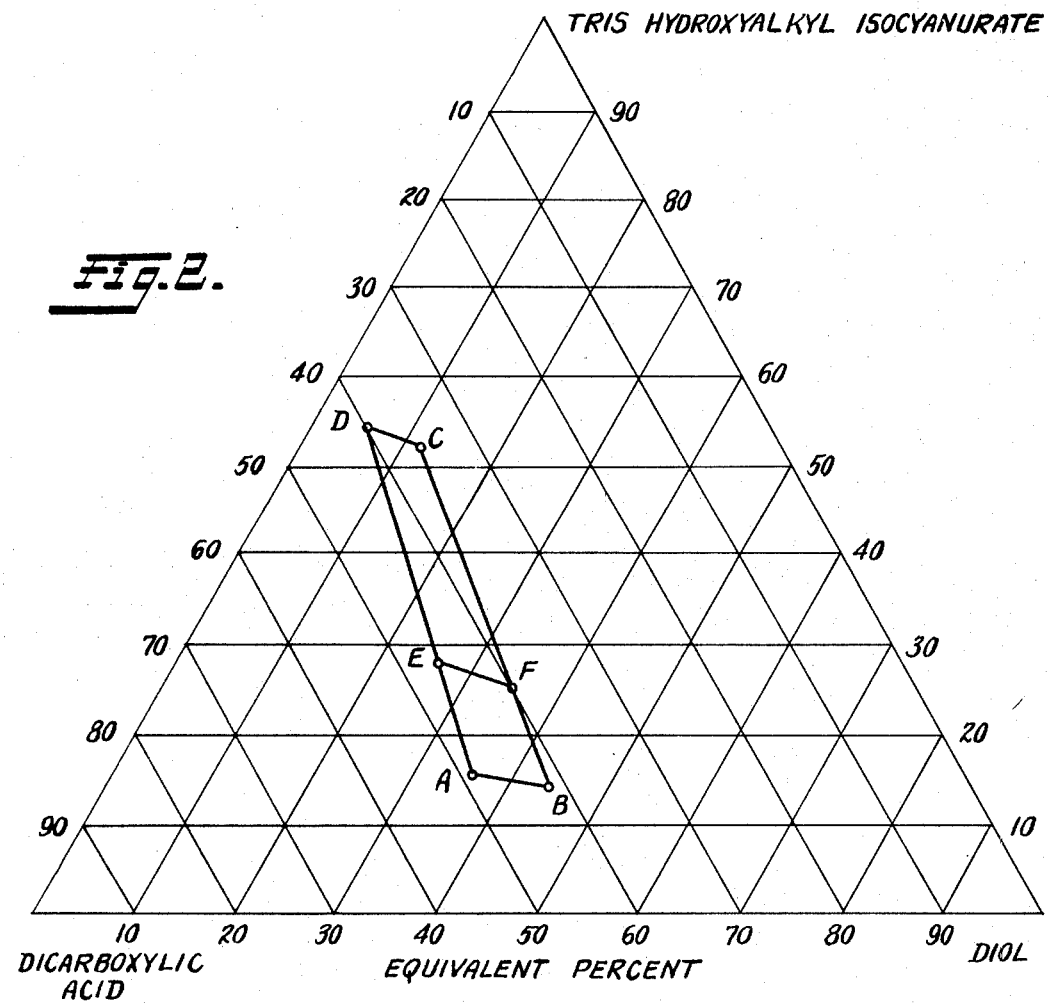
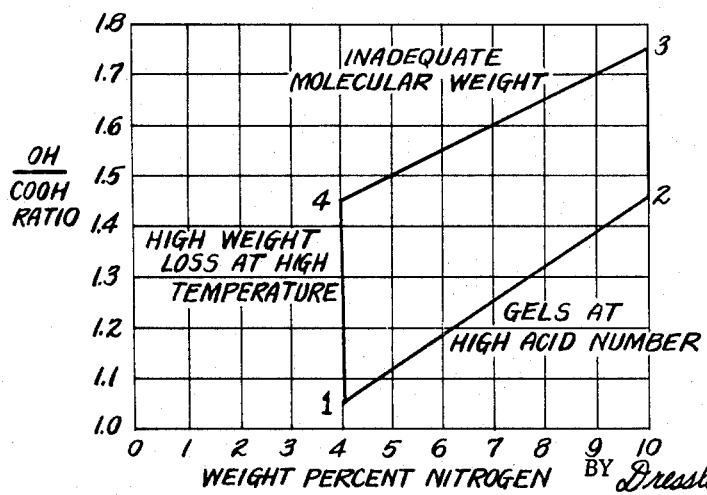

3,390,117
USE OF ALKYL PHENOL-MODIFIED AMINOPLAST RESINS TOGETHER WITH TITANIUM ION IN COATING SOLUTIONS CONTAINING COPOLYESTERS BASED ON TRIS-HYDROXYALKYL ISOCYANURATES AND DICARBOXYLIC ACIDS
Naaman F. Barr, Pine Township, Allegheny County, Milan J. Getting, Ben Avon, and Jack S. Skinner, Pittsburgh, Pa., assignors, by mesne assignments, to Mobil Oil Corporation, a corporation of New York
Filed Dec. 11, 1964, Ser. No. 417,744
14 Claims. (Cl. 260—33.4)

ABSTRACT OF THE DISCLOSURE

Wire coating solutions yielding improved Emerson scrape resistance are provided by dissolving in an organic solvent including an alkyl phenol component:
(1) certain specific copolyesters formed by the copolyesterification reaction of:
 (A) aromatic dicarboxylic acid;
 (B) aliphatic diol containing from 2–10 carbon atoms; and
 (C) tris-hydroxyalkyl isocyanurate,
(2) an alkyl phenol-modified aminoplast resin; and
(3) titanium ion as catalyst.

---

The present application is related to the prior application of Gerald P. Roeser, Ser. No. 313,934 filed Oct. 4, 1963.

The present invention relates to organic solvent solution coating compositions for the coating of wire and foil and particularly contemplates the achievement of improved properties from coating solutions which include copolyesters based on tris-hydroxyalkyl isocyanurates.

As is more fully explained in said prior application, certain copolyesters based on tris-hydroxyalkyl isocyanurate form the basis for valuable high temperature-resistant coatings especially useful for the coating of wire. However, properties other than resistance to elevated temperature are of importance to coated wire and it is desirable to maximize these properties, particular reference being had to the physical toughness of the coating which reveals itself in the capacity of the coating to withstand such stresses as are imposed by scraping, twisting and slitting.

In the present invention, coating formulations are provided in which copolyesters based on a tris-hydroxyalkyl isocyanurate are combined with alkyl phenolic-modified, organic solvent-soluble, heat-hardening aminoplast resin and the curing capacity of the mixture is enhanced by the presence of dissolved titanium ion, preferably in the form of a titanium cresylate. These, in the invention, cure uniquely to provide high temperature-resistant coatings which are considerably tougher than could be produced heretofore.

Referring first to the tris-hydroxyalkyl isocyanurate copolyesters which are used in the invention, these copolyesters contain three essential components. The first component is an aromatic dicarboxylic acid. The preferred acids are those which, with ethylene glycol, have the capacity of forming high molecular weight, cold-drawable homopolyesters. The acids which are particularly preferred are selected from the group of isophthalic acid, terephthalic acid, benzophenone dicarboxylic acid and mixtures thereof. Benzophenone dicarboxylic acids has the formula:

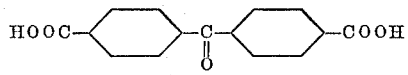

The second essential component of the copolyester is aliphatic diol containing from 2–10 carbon atoms. Various aliphatic hydrocarbon diols may be used, including cycloaliphatic diols, the preferred diol being ethylene glycol. 1,4-butane-diol; 1,5-pentanediol; and 1,4-butene-2-diol illustrate other preferred diols for use alone or together with ethylene glycol. Other diols which may be used are illustrated by 1,2-propanediol; 1,3-propanediol; 1,6-hexanediol; 1,3-cyclobutane diol; 1,4-cyclohexane diol; 1,4-cyclohexane dimethanol, etc. The preferred diols are straight chain diols having from 2–5 carbon atoms and two primary hydroxy groups.

The third essential component of the copolyester is tris-hydroxyalkyl isocyanurate which may be represented graphically by the formula:

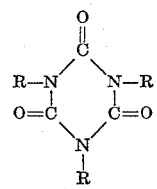

in which R represents a hydroxy alkyl radical containing at least two carbon atoms (i.e., 2-hydroxyethyl—$CH_2CH_2OH$)

preferably two to four carbon atoms. The preferred isocyanurate is tris-2-hydroxyethyl isocyanurate. The isocyanurates and their production are more fully described in U.S. Patent No. 3,088,948, dated May 7, 1963, the disclosure of which is hereby incorporated by reference.

The copolyesters of the invention consist essentially of the three components identified hereinbefore and the proportions of these components are critically inter-related. From the broad standpoint, the copolyesters consist essentially of:
(A) from 36–49 equivalent percent of the defined dicarboxylic acids;
(B) from 6–43 equivalent percent of the defined aliphatic diols; and
(C) from 15–54 equivalent percent of tris-hydroxyalkyl isocyanurate.

The above broad indication of proportions is not adequate to identify the components which are used in the invention and the only feasible way of accurately defining proportions is graphically. This technique has been adopted in the triangulation presented herewith (FIG. 2) in which the effective proportions in accordance with the invention are defined as falling within the closed area A–B–C–D–A. The preferred proportions fall within the closed area E–F–C–D–E, the line E–F denoting copolyesters which contain about 6% nitrogen by weight.

A portion, up to about 50% by weight, of the tris-hydroxyalkyl isocyanurate component, can be constituted by any polyhydric alcohol having at least three hydroxyl groups, such as glycerin; pentaerythritol; 1,1,1-trimethylolethane; 1,1,1-trimethylolpropane; sorbitol, mannitol; dipentaerythritol; diglycerol, etc., but this is not preferred since, and despite the economy of using glycerin, these polyhydric alcohols have been found to be detrimental to high temperature resistance.

The term "equivalent percent" designates the percentage computed for each reactant in accordance with the formula:

Equivalent Percent of Reactant=
$$\frac{100 \times \text{Equivalents of Reactant}}{\text{Total Equivalents}}$$

in which the number of equivalents of any reactant is the number of moles of the reactant multiplied by the number of functional groups present in the reactant, e.g., 2 for phthalic acid, 2 for ethylene glycol and 3 for tris-hydroxyalkyl isocyanurates.

The use of acids in the polyesterification reaction is preferred for best high temperature properties.

The copolyesters found to be useful in accordance with the invention have a specific viscosity (relative viscosity minus 1.0) measured at 77° F. in a 1 gram per deciliter solution in a solvent mixture containing 60 parts of phenol to 40 parts of tetrachlorethane in the range of from about 0.10–0.70. It has been found that from the standpoint of overall properties, it is preferred to employ copolyesters having a specific viscosity as indicated hereinbefore in the range of from 0.15–0.30.

Relative viscosity is determined in an Ostwald-Fenske viscosimeter and is computed as follows:

$$\text{Relative viscosity} = \frac{\text{Solution efflux time}}{\text{Solvent efflux time}}$$

The relative viscosity is thus obtained by direct measurement. Specific viscosity may be derived by subtracting 1.0 from the relative viscosity.

The preferred copolyesters are desirably produced by a single stage reaction conducted in the presence of effective esterification catalysts at temperatures in the range of from 200 up to about 230° C.

The high temperature catalyzed reaction is essential for, otherwise, the reaction mixture must be maintained at a temperature in excess of the decomposition temperature of the isocyanurate for an excessive length of time. It is preferred, in accordance with the invention, to obtain yields which are approximately stoichiometric within a period up to about 8 hours, preferably 4–6 hours. If the reaction does not proceed this quickly, then the extent of decomposition and inter-molecular cross-linking which takes place is excessive, or resin production must be stopped at an inadequate yield or before the reaction has proceeded to provide a sufficiently lowered acid number.

In accordance with the invention, the acid number should be lowered below about 30, preferably below 20.

In the presence of an effective esterification catalyst, illustrated by 0.25% by weight of total reactants of antimony trioxide, a reaction temperature in the range of 220–230° C. is preferred for periods of time up to about 7 hours.

It is also important to employ appropriate ratios of diol to triol in the copolyester and this will vary with the nitrogen content of the copolyester which may range from 4 to 10% by weight.

The ratios of OH/COOH which are useful in the invention are defined by the closed area 1–2–3–4–1 of FIG. 1.

The copolyester product is desirably provided in the form of a solvent solution, preferred solvents being alkylated phenols which are desirably used in the form of liquid mixtures. Various commercial mixtures are known to the art under the generic term of cresylic acid.

The production of a preferred copolyester is as follows:

EXAMPLE I

In a 72 liter 3-necked flask equipped with a powerful stirrer through the center neck, a thermometer in one side well, and on the other side well a steam-heated 40 inch Allihn condenser leading to a water-cooled condenser and receiver for collecting the water of esterification, there are charged 2880 g. (46.5 moles) ethylene glycol, 9525 g. (36.5 moles) tris(2-hydroxyethyl)isocyanurate, and 12,450 g. (75.0 moles) terephthalic acid. If catalyst is to be used, 62 g. (0.25%) of antimony oxide is added. The ingredients are heated with agitation to about 200° C. in ninety minutes. Water and glycol reflux in the steam jacketed condenser with the glycol returning to the pot and the water volatilizing over into the receiver. After 5 to 9 hours of heating, not exceeding 220–230° C. pot temperature, all the water of esterification which will develop is recovered —2575–2640 g. or 95.3–97.8% of theory. The acid value is checked by titrating a sample of the resin melt dissolved in pyridine with 0.01 N potassium hydroxide solution to the phenolphthalein end point. According to the OH/COOH ratio used, it can vary up to 30, but in the above batch is about 5.0. A sample of the melt is dissolved in 60/40 phenol/tetrachlorethane at a concentration of 1 gram per deciliter and the specific viscosity determined at 77° F. It may vary from 0.10 to 0.70 according to the OH/COOH ratio and final acid value selected. In this case it is 0.22, 22,215 g. of cresylic acid (see note 1) are added to the hot resin and the solution discharged. Solids of the solution are determined, usually 51–53%, and a sample is diluted with 60/40 phenol/tetrachlorethane to a concentration of 1 g. per deciliter. Specific viscosity is again determined and comes out to 0.23.

This copolyester had a OH/COOH ratio of 1.35/1.00 and a theoretical nitrogen content of 6.91%.

NOTE 1

| Solvent composition of: | Weight percent |
|---|---|
| Phenol | 44 |
| o-Cresol | 14 |
| m-Cresol | 13 |
| p-Cresol | 5 |
| Mixed xylenols | 24 |

The organic solvent-soluble, heat-hardening aminoplast resins which are used in accordance with the present invention form a well known class of resinous materials which are formed by the reaction of a polyamine and particularly a triazine, notably melamine, with excess aldehyde, especially formaldehyde, and in the presence of an alcoholic solvent to provide organic solvent solubility, normally through at least partial etherification of the alkylol (methylol) groups of the resin by the alcohol solvent. Other polyamines are illustrated by urea, benzoguanamine and various triazines including dicyandiamide. Normally, the solvents contain at least 3 carbon atoms, butanol, ethoxy ethanol and 2-butoxy ethanol being particularly common. The reaction may be conducted in acid, essentially neutral or in alkaline medium, as is well known.

It is essential in accordance with the invention that this solvent-soluble, heat-hardening aminoplast resin be modified by cooking the same with an alkyl phenol or mixture of alkyl phenols. Appropriate alkyl phenols are the various isomeric cresols, especially mixtures thereof and also the various isomeric xylenols and their mixtures with one another and with the various cresols. While cresols and xylenols are particularly preferred, other alkyl phenols may be used or may be present in admixture with the cresols and xylenols which are preferred. Halogen-substituted alkyl phenols may also be present, especially in minor amount (up to about 15% by weight of the total weight of alkyl phenol). While reliance is had upon the use of alkyl phenols, halogen-substituted phenols such as orthochloro phenol may be present, especially if the proportion thereof is kept small to minimize the corrosive influence of the chlorophenols. The preferred alkyl groups are $C_1$–$C_4$ alkyl groups, especially methyl groups. The alkyl phenol-modified aminoplast resin should be used in an amount of about 2–25% of the weight of the polyester, preferably from 4–12% by weight, said weight percentages being based on non-volatile aminoplast resin solids prior to modification.

The use of alkyl phenols to modify the aminoplast resin is essential in accordance with the invention since other similar modifying agents have been tested without success. Thus, and within the ambit of the invention, commercial cresylic acids have been checked as well as substantially pure o-cresol and 3,5-xylenol, with good results in each instance. On the other hand, phenol itself was inadequate, long chain alcohols such as dodecyl alcohol provide an aminoplast resin which is incompatible with the polyester and therefore useless, and benzyl alcohol, while compatible, did not provide successful results.

All that is required for the modifications of the aminoplast resin with the alkyl phenol is that the two be cooked together thoroughly which causes a reaction to take place therbetween. The fact of reaction is easily noted by a reduction in the nitrogen content of the resin solids. A marked increase in the hydroxyl number of the product has also been noted as a result of the alkyl phenol cook. Cooking is facilitated by removing the lower boiling alcohols, such as butanol, with which aminoplast resins are normally associated, but this is not essential. The removal of butanol also improves the flow of the coating solution.

Since the invention employs alkyl phenol-modified aminoplast resins, the coating solutions made therefrom will naturally include an alkyl phenol component as an important part of the solvent system of the coating solution and, preferably, as a major weight component of the solvent phase thereof.

It is also essential that dissolved titanium ion be present as catalyst. Other metal ions such as aluminum, zinc and magnesium also exert a catalytic curing activity but these do not provide the uniquely superior properties which are provided by the titanium ion.

To maximize compatibility of the various components in the system, the dissolved titanium ion is preferably provided in the form of a titanium complex with the previously described alkyl phenols. Thus, the organic derivative of titanium with a mixture of cresols can be identified as a titanium cresylate. While titanium cresylates are preferred, they are not essential and other organic derivatives of titanium providing titanium ion in a form permitting its dissolution, such as tetrabutyl titanate, may be used.

The titanium catalyst is desirably present in an amount (based on titanium metal) of at least about 0.1% of the weight of the polyester to be cured, though it is preferred to employ proportions of at least about 0.2% up to about 1.5% of the catalyst. Particularly preferred proportions are from 0.3 to 0.8%. It is also preferred to interrelate the proportion of titanium catalyst with the proportion of aminoplast resin, a preferred weight ratio of aminoplast resin to titanium catalyst being from 30:1 to 10:1, from 20:1 to 15:1 being viewed as optimum. Again, the titanium content is based on the weight of metal and the aminoplast resin is measured by the weight of non-volatile resin solids prior to modification.

EXAMPLE II

Formation of titanium cresylate

To a stainless steel kettle equipped with an agitator, a reflux condenser and a heating and cooling source charge 60 pounds of a 50/50 phenol/o-cresol mixture, 20 pounds of tetrabutyl titanate and 20 pounds of an aromatic hydrocarbon solvent having a boiling range of 145–195° C. While agitating, heat to reflux (300–315° F.) within four hours and hold at reflux for thirty minutes. Cool to room temperature (80–90° F.) as quickly as possible—in less than one hour.

The intermediate thus prepared should be stored in air-tight containers at temperatures above 60° F. and should be used within two months of manufacture.

EXAMPLE III

Modification of aminoplast resin with alkyl phenol

To a stainless steel kettle equipped with an agitator, a heating and cooling source, a distillate condenser-receiver and a source of vacuum, charge 85 pounds of a cresylic acid and 15 pounds of a 66.7% solids solution of butylated heat-hardening melamine-formaldehyde resin. While agitating, heat to 273° F. and hold for five minutes at atmospheric pressure. While continuing to maintain the same heat input apply a vacuum to remove 25 pounds of solvent including any butanol introduced by the resin solution charged. This distillate is discarded and the remainder of the charge is cooled to room temperature and transferred to suitable containers for storage.

The cresylic acid referred to in these examples contains the following components:

| Cresylic acid analysis: | Percent by weight |
|---|---|
| Phenol | 10.1 |
| Ortho-cresol | 12.9 |
| 2,6-xylenol | 0.3 |
| Meta-para cresol | 27.9 |
| Ortho-ethyl phenol | 1.1 |
| 2,4- 2,5-xylenol | 15.9 |
| 2,3-xylenol | 19.6 |
| 3,4-xylenol | 7.0 |
| Alkyl-substituted phenols containing 9 carbon atoms | 5.2 |

The melamine-formaldehyde resin used in this example is made as follows:

521 grams of a 40% solution of formaldehyde in isobutanol (contains about 7% of water) is charged to a two liter flask together with 72 grams of water and the mixture is adjusted to a pH of from 6.8–7.4 with sodium hydroxide. 187 grams of melamine and 293 grams of n-butanol are added and the mixture is heated to 70–80° C. in 20 minutes and is held at this temperature for 25 minutes. The temperature is then raised to about 99° C. at which point distillation occurs and the mixture is refluxed, the water being collected and the butanol being returned to the flask. After distilling for an hour and 20 minutes, 1 gram of 50% formic acid and 11 grams of n-butanol are added slowly over a 1 hour period and the distillation is continued for a total distilling time of 3½ hours. Vacuum is then applied and approximately 209 grams of butanol are removed by the vacuum application. At this point, the vacuum is removed and the product is thinned by the addition of approximately 96 grams of xylol to provide a solution product having a non-volatile resin solids content of 66.7%.

Other aminoplast resins have successfully been used in place of the melamine-formaldehyde resin referred to above. Thus, there are many commercial organic solvent-soluble, heat-hardening melamine-formaldehyde resins and several of these were tested and found to be operable. Similarly, a commercial butylated triazine formaldehyde resin was used successfully, though the melamine resins are preferred. Butylated urea-formaldehyde resins were also checked and found to be useful.

It is of possible significance to note that a great degree of resinification is not necessary since a commercial monomeric hexamethoxy hexamethylol melamine was tested and found to be useful.

From the standpoint of commercially available aminoplast resins, the following were used successfully by following the procedure of the present Example III:

TABLE I

| Resin Type | Trade Name | Supplier | Percent Solids in Resin Solution | Solvent Composition (percent total solvent) | |
|---|---|---|---|---|---|
| | | | | Butanol | Xylol |
| Melamine-Formaldehyde | Uformite MM-55 | Rohm & Haas | 50 | 80 | 20 |
| | Plaskon 3382 | Allied Chemical | 55 | 56 | 44 |
| | Plaskon PR-269 | do | 60 | Note 1 | |
| Urea-Formaldehyde | Plaskon 3300 | do | 50 | 60 | 40 |
| | Beetle 227-8 | American Cyanamid | 50 | 60 | 40 |
| Triazine | Uformite MX-61 | Rohm & Haas | 60 | 50 | 50 |

NOTE 1.—The solvent is a commercial mixture of aromatic hydrocarbon solvents having a boiling range of 375–410° F.

EXAMPLE IV

Control

The ingredients of Example III are combined and the cooking and solvent stripping steps of that example are omitted so that the product is a mere physical mixture of cresylic acid and melamine-formaldehyde resin.

The coating solutions of the invention are desirably applied to aluminum or copper wire or foil and baked to provide heat resistant coatings of improved physical toughness. In such utility it is particularly desirable to overcoat the coatings of the invention with a topcoat material such as an essentially linear cold-drawable high molecular weight polyethylene terephthalate such as "Mylar" to improve the capacity to resist thermal shock.

The results which can be achieved in accordance with the invention are illustrated in Table II which follows which reports Emerson scrape resistance values for copper wire coated in accordance with the invention and then overcoated with "Mylar." In each instance the coating solution identified in the table is applied to No. 18 AWG copper wire to provide a total coating build of 2½ mils and then given a final coat of a linear polyester ("Mylar") thereby increasing the total coating build to 3 mils as measured by a micrometer (actual coating thickness, 1½ mils). The wire enamels of the invention are applied in 5 separate coats with the linear polyester ("Mylar") adding a sixth coat. Each coat is baked before the application of the succeeding one. The baking equipment used is a vertical tower having a 12 foot heating zone in an overall length of 15 feet. The temperatures range from 250° F. at the bottom to 800° F. at the top of the heating zone. The wire is moved through the tower at a speed of 23 feet per minute.

The proportions set forth in the table are in parts by weight of non-volatile resin solids, the modified melamine resin being measured in parts by weight of non-volatile resin solids prior to modification and the titanium catalyst being measured in parts by weight of titanium metal.

On the other hand, in run E+heat, cooking of the coating solution after its formulation, but prior to deposition of the coating solution on the wire to thereby modify the aminoplast resin with the alkyl phenol in situ, caused a marked improvement and a close approximation to the properties reported in run F.

The invention is defined in the claims which follow.

We claim:

1. A coating solution comprising organic solvent including a $C_1$–$C_4$ alkyl phenol component having dissolved therein:

(1) a thermally convertible copolyester possessing improved elevated temperature exposure resistance and consisting essentially of the copolyesterification reaction product of:

(A) aromatic dicarboxylic acid having the capacity of forming high molecular weight, cold-drawable homopolyesters with ethylene glycol;
   (B) straight chain diol having from 2–5 carbon atoms and two primary hydroxyl groups; and
   (C) tris(2-hydroxyethyl)isocyanurate, the equivalent proportions of said components (A), (B) and (C) being defined by the closed area A–B–C–D–A in the accompanying triangulation, said copolyester having a specific viscosity in the range of from 0.10 to 0.70, viscosity being measured at 77° F. in a 1 gram per deciliter solution in a solvent mixture of 60 parts of phenol to 40 parts of tetrachlorethane, said reaction product having an acid number below 30;

(2) $C_1$–$C_4$ alkyl phenol-modified, organic solvent-soluble, heat-hardening aminoplast resin in an amount, based on unmodified aminoplast resin solids, of about 2–25% of the weight of said reaction product; and (3) titanium ion as catalyst in an amount, based on titanium metal, of at least about 0.1% of the weight of said reaction product.

2. The coating solution of claim 1 in which said aro-

TABLE II

| Polyester of Example I | A, 100 | B, 100 | C, 100 | D, 100 | E, 100 | F, 100 | G, 100 | H, 100 | I, 100 | J, 100 | C+Heat, 100 | E+Heat, 100 |
|---|---|---|---|---|---|---|---|---|---|---|---|---|
| Titanium Catalyst of Example II | | | 0.3 | | | 0.3 | 0.3 | 0.6 | 0.6 | 0.6 | | 0.3 |
| Melamine Resin Control of Example IV | | 5.3 | | | 5.3 | | | | | | 5.3 | 5.3 |
| Alkyl phenolmodified Melamine Resin produced in Example III | | | | | | 5.3 | 5.3 | 10.6 | 5.3 | 10.6 | 21.2 | |
| Emerson Scrape Resistance (in pounds of pressure, see note 2) | 15 | 18 | 16 | 14 | 18 | 35 | 21 | 40 | 27 | 20 | 12 | 32 |

NOTE 2.—Emerson scrape resistance is a measure of the physical toughness of the coating. In this test, a length of coated wire is pulled at 60 ft./minute underneath a spring loaded needle with the wire in bearing contact with the sidewall of the needle. The pressure is varied to obtain the maximum load at which the coating is not completely removed exposing bare wire. For satisfactory commercial performance values in excess of 20 lb. pressure are required and in excess of 25 lb. are highly desired.

Referring more particularly to the above Table II, it will be observed that the physical toughness (as indicated by Emerson scrape resistance) of the films which are deposited is significantly improved by the practice of the present invention since it is only in this way that Emerson scrape values of 20 or higher were obtainable.

With particular reference to runs A, B, C, D and E, none of these were satisfactory including test E which is the closest approximation to the invention. In direct contrast, when the melamine-formaldehyde resin was cooked with cresplic acid per Example III (the sole distinction between runs E and F), a very dramatic improvement in the physical toughness of the film takes place. The preferred proportions of the invention are derived from the type of evidence noted in runs G, H, I and J.

The table also includes two runs identified respectively as C+heat and E+heat which serve to demonstrate that the cooking of the aminoplast resin with the alkyl phenol as taught in Example III may take place either before or after blending with the other components of the system. In the unsuccessful run (C+heat), cooking after mixing was not helpful in the absence of the titanium catalyst.

matic dicarboxylic acid is selected from the group consisting of isophthalic acid, terephthalic acid, benzophenone dicarboxylic acid and mixtures thereof.

3. The coating solution of claim 1 in which the equivalent proportions of said components (A), (B), and (C) are defined by the closed area E–F–C–D–E in the accompanying triangulation.

4. The coating solution of claim 1 in which said reaction product is formed by the copolyesterification of terephthalic acid, ethylene glycol and tris(2-hydroxyethyl) isocyanurate.

5. The coating solution of claim 1 in which said aminoplast resin is modified by cooking the same with said alkyl phenol.

6. The coating solution of claim 5 in which said aminoplast resin is associated with an alcohol prior to modification thereof with alkyl phenol and the cooking of said alkyl phenol with said aminoplast resin includes removal of said alcohol.

7. The coating solution of claim 1 in which said aminoplast resin is a melamine-formaldehyde condensate.

8. The coating solution of claim 1 in which said titanium ion is supplied by a titanium cresylate.

9. The coating solution of claim 1 in which said catalyst is employed in an amount of from 0.2–1.5%, based on the weight of said reaction product.

10. The coating solution of claim 1 in which the weight ratio of said aminoplast resin to said titanium catalyst is from 30:1 to 10:1.

11. A metal substrate coated with a baked film of the coating solution of claim 1.

12. Copper wire coated with a baked film of the coating solution of claim 1.

13. Aluminum wire coated with a baked film of the coating solution of claim 1.

14. A coating solution comprising organic solvent including a cresylic acid component having dissolved therein:
- (1) a thermally convertible copolyester possessing improved elevated temperature exposure resistance and consisting essentially of the copolyesterification reaction product of:
  - (A) aromatic dicarboxylic acid having the capacity of forming high molecular weight, cold-drawable homopolyesters with ethylene glycol;
  - (B) ethylene glycol; and
  - (C) tris(2-hydroxyethyl)isocyanurate,
  the equivalent proportions of said components (A), (B) and (C) being defined by the closed area A–B–C–D–A in the accompanying triangulation, said copolyester having a specific viscosity in the range of from 0.10 to 0.70, viscosity being measured at 77° F. in a 1 gram per decilter solution in a solvent mixture of 60 parts of phenol to 40 parts of tetrachlorethane, said reaction product having an acid number below 30;
- (2) cresylic acid-modified, organic solvent-soluble, heat-hardening aminoplast resin in an amount, based on unmodified aminoplast resin solids, of about 2–25% of the weight of said reaction product; and
- (3) titanium ion as catalyst in an amount, based on titanium metal, of at least about 0.1% of the weight of said reaction product.

References Cited

UNITED STATES PATENTS

| | | | |
|---|---|---|---|
| 2,894,934 | 7/1959 | Burkhard | 260—33 |
| 3,036,028 | 5/1962 | Malashevetz | 260—51.5 |
| 3,070,572 | 12/1962 | Oland et al. | 260—51.5 |
| 3,297,785 | 1/1967 | George et al. | 260—850 |

MORRIS LIEBMAN, *Primary Examiner.*

S. L. FOX, *Assistant Examiner.*